United States Patent [19]

Ito

[11] Patent Number: 4,813,738
[45] Date of Patent: Mar. 21, 1989

[54] AUTOMOTIVE SEAT WITH HEATING DEVICE

[75] Inventor: Kunihiko Ito, Akishima, Japan
[73] Assignee: Tachi-S Co., Ltd., Tokyo, Japan
[21] Appl. No.: 143,223
[22] Filed: Jan. 4, 1988
[51] Int. Cl.$^4$ ............................ A47C 7/72; A47C 21/04
[52] U.S. Cl. ........................................ 297/180; 5/421; 297/452; 297/453
[58] Field of Search ................ 219/217; 297/180, 453, 297/452; 5/467, 461, 421

[56] References Cited

U.S. PATENT DOCUMENTS

| | | | |
|---|---|---|---|
| 3,136,577 | 6/1964 | Richard | 297/180 |
| 4,043,544 | 8/1977 | Isnier | 297/453 |
| 4,558,905 | 12/1985 | Takashi | 297/180 |
| 4,633,061 | 12/1986 | Arikawa | 297/217 X |

Primary Examiner—James T. McCall
Attorney, Agent, or Firm—Browdy & Neimark

[57] ABSTRACT

An automotive seat having a built-in heating device, comprises a foam main cushion body, a sub cushion body mounted on the main cushion body, and a covering member which covers those cushion bodies, wherein a heating device is accommodated in a recessed region formed in either of the sub cushion body and the main cushion body, so as to avoid an unpleasing strange or hard touch caused by the heating device per se.

5 Claims, 2 Drawing Sheets

AUTOMOTIVE SEAT WITH HEATING DEVICE

BACKGROUND OF THE INVENTION

1. Field of the Invention

The present invention relates to an automotive seat having a built-in heater, and in particular relates to an automotive seat of such type so designed to avoid a hard touch resulting from the built-in heater or heating device, to provide an unimpaired soft seating touch of the seat.

2. Description of the Prior Art

There have been known various automtoives seats of the type having a built-in heating device adapted to warm the body of occupant who sits on the seat. For instance, the U.S. Pat. No. 4,558,905 and Swedish Patent No. 8400387-0 discloses a seat in which a heating device is incorporated within a trim cover assembly covering a foam cushion body.

According to these conventional seats, a hard touch is felt by the occupant sitting thereon, which develops from the presence of the heating device in the seat, with the result that a soft seating touch is not attained from the seat.

Further, in the prior arts, the heating device is sandwiched between a top cover member and wadding of the trim cover assembly, and consequently, the drawback is that it requires a special design for preventing the dislocation of the heating device within the trim cover assembly, and it is also complicated in structure, resulting in a high increase of costs for the seat assemblage.

In addition to this fact, conventionally, it has been impossible to incorporate a heating device in a seat of the kind formed by bonding a covering member to the surface of a cushion body.

SUMMARY OF THE INVENTION

It is a primary purpose of the present invention to provide an automotive seat with a heating device which eliminates a hard or strange touch caused by the presence of the heating device.

To achieve the above purpose, the present invention comprises a foam main cushion body formed by foaming in a mold, a sub cushion body mounted on the main cushion body, and a heating device provided between the main cushion body and sub cushion body.

Accordingly, the sub cushion body overlies the heating device, which prevents an occupant sitting on the seat from feeling any hard or strange touch of the heating device.

Moreover, in accordance with the present invention, there is formed a recessed portion in either the sub cushion body or the main cushion body, which is adapted for accommodating the heating device therein. Namely, either in the inner surface of the sub cushion body facing that of the main cushion body or in the inner surface of the main cushion body facing that of the sub cushion body, a recessed portion is formed in which the heating device is accommodated so as to prevent its dislocation.

It is noted here that the sub cushion body is made of an air permeable slab material (having plural open cells therein), permitting heat to be transmitted from the heating device via the sub cushion body and a covering member up to the occupant's body.

It is another purpose of the present invention to provide an automotive seat with a heating device which can be easily produced at a lower costs.

To this end, as mentioned above, according to the present invention, a recessed portion is formed in either of the sub cushion body and main cushion body for accommodating the heating device therein, and therefore the seat is assembled quite simply by placing the heating device in the recessed portion. Accordingly, there is eliminated the necessity to insert the heating device between the top cover member and wadding of the trim cover assembly and sew them up as with the aforementioned prior arts. Further, to assemble the seat of the present invention, the sub cushion body and main cushion body are bonded together by an adhesive in conformity with the upper seating contour of the seat, which is quite easy for the seat assemblage, because there is no need to stretch the trim cover assembly along the seating portion of the main cushion body, as in the prior arts.

DETAILED DESCRIPTION OF PREFERRED EMBODIMENTS OF THE INVENTION

Figure 1:
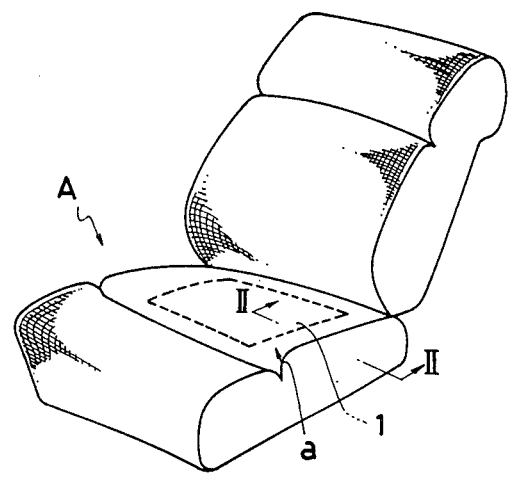
FIG. 1 is a perspective view of an automotive set with a heating device in accordance with the present invention.

Referring to FIG. 1, there is illustrated an automotive seat in accordance with the present invention, in which designation (a) represents a seat cushion. A heating device (1) is incorporated in the buttocks support portion (a) of the seat cushion (A) in order to warm the buttocks of an occupant who sits on the seat.

Figure 3:
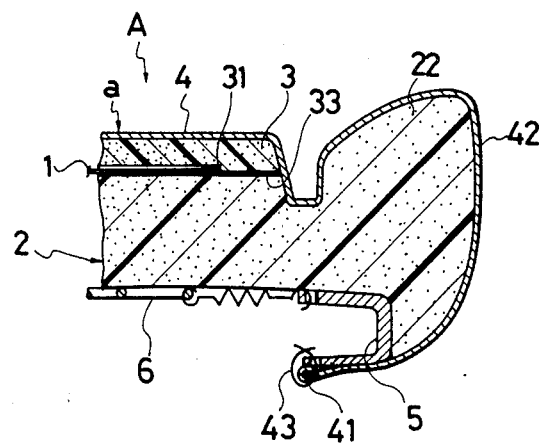
FIG. 3 is a partially enlarged view showing a part of the seat in the FIG. 2.
Figure 2:
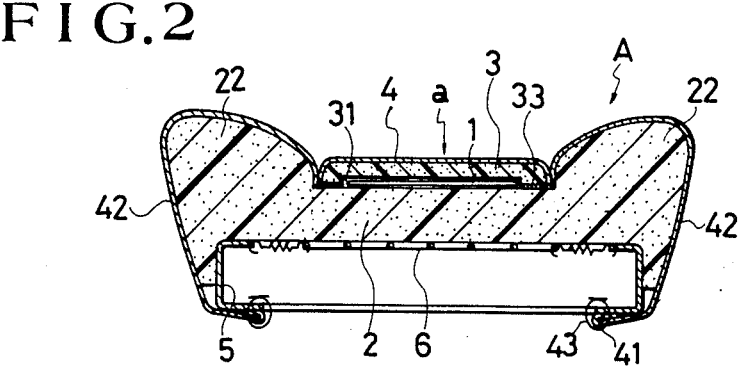
FIG. 2 is a sectional view taken along the line II—II in the FIG. 1.
Figure 4:
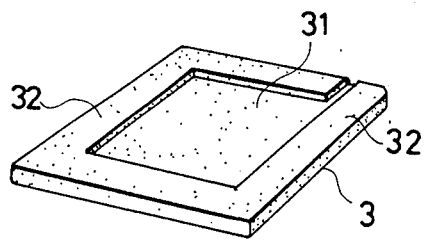
FIG. 4 is a perspective view showing the state where a sub cushion body is turned inside out.

Specifically, reference is now made to FIGS. 2, 3 and 4. In this particular embodiment, the seat cushion (A) is comprised of a main cushion body (2) mounted on a frame (5), a sub cushion body (3) attached on the central upper surface portion of the main cushion body (2), and a covering member (4) which covers the entire outer surfaces of both main and sub cushion bodies (2) and (3). Numeral (6) denotes a spring member extended in the frame (5).

The heating device (1) is arranged between the main and sub cushion bodies (2) and (3), which will be described more specifically later.

The main cushion body (2) is made of a foam material (for example, urethane foam) and foamed in a mold into a predetermined outer contour of the seat cushion (A), and as illustrated, has an integral raised portion (22) formed in each of its both lateral portions, thus being of such configuration that the central portion defined between the raised portions (22) is recessed downwardly.

The sub cushion body (3) is made of a flat-plate-like foam slab material with air permeable property having plurality open cells formed therein and also having a greater elasticity relative to the main cushion body (2).

As best shown in FIG. 4, in the inner rear side of the sub cushion body (3) which faces the recessed central portion of the main cushion body (2), a recessed region (31) is formed adapted for accommodating the heating device (1) therein. In an actual seat assembling process, the heating device (1) is placed within such recessed region (31) of the sub cushion body (3), and then the sub cushion body (3) is bonded at its peripheral edge portion (32) to the central portion of the main cushion body (2), so that the heating device (1) is disposed between the main and sub cushion bodies (2) and (3), as seen in FIG. 2.

The heating device (1) is a commonly available electric heater for use in the automotive seat of this type and connected via a lead wire to a battery equipped in the automobile.

The covering member (4) is preferably made of an air permeable cloth (e.g. a woven fabric or knitting), and is bonded by an adhesive to the entire outer surfaces of both sub and main cushion bodies (2) and (3) excepting the mutually bonded area of those two bodies, as best shown in FIG. 3. In this regard, the adhesive is applied to the sub and main cushion bodies (3) and (2) in a scattered manner so that air permeability is maintained through the covering member (3) and those two cushion bodies (2) and (3). The bonding of the covering member (3) is effected to the cushion bodies (2) and (3) by application of a pressure thereto, after an adhesive applying process.

The terminal end (41) of the covering member (4) is fixedly secured to the frame (5) or other proper part of the seat by means of a hog ring (43).

With regard to the lateral side portion (42) of the covering member (4), it is not necessarily required that the lateral side portion (42) be bonded to the corresponding lateral wall of the main cushion body (2).

It is, therefore, to be appreciated that the incorporation of the heating device (1) within the recessed region (31) of the sub cushion body (3) effectively avoids a hard or strange touch of the heating device (1) to an occupant sitting on the seat because the sub cushion body (3) overlies the heating device (1) to thereby prevent its hardness from being felt by the occupant.

Figure 5:
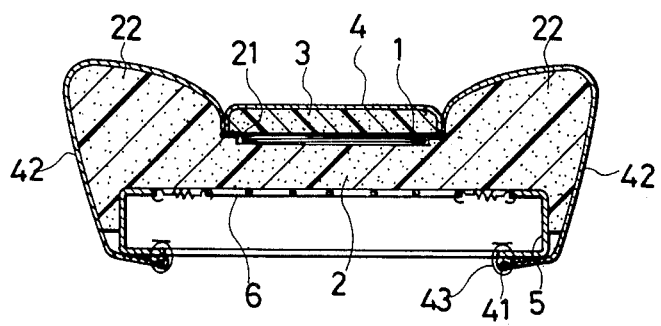
FIG. 5 is a sectional view showing a second embodiment of the invention in which a heating device is provided in a recessed portion formed in a main cushion body.
Figure 6:
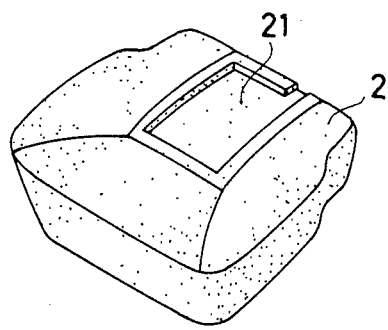
FIG. 6 is a perspective view of the main cushion body according to the second embodiment shown in FIG. 5.

FIGS. 5 and 6 shows another embodiment of the present invention. In this embodiment, contrary to the above-described first one, there is formed a recessed region (21) in the upper surface of the main cushion body (2), which recessed region (21) is like-wise adapted to accommodate the heating device (1) therein. A covering member (4) illustrated is bonded by an adhesive to the entire surfaces of both main and sub cushion bodies (2) and (3) in the same manner as in the first embodiment above. With this structure, the sub cushion body (3) overlies the heating device (1), and as such, similarly to the first embodiment, the hardness of the heating device is prevented from being felt by an occupant on the seat.

While, in both two embodiments above, the sub cushion body (3) is bonded to the main one (2), it is optional to merely place the former upon the the latter in a non-bonded manner. Even in this case, there is no movement of the sub cushion body (3) relative to the main cusion body (2), due to the fact that the covering member (4) is so integrally bonded to the main cushion body (2) as to secure the sub cushion body (3) tightly thereto.

As having been described hereinbefore, according to the present invention, the sub cushion body (3) is placed on the main cushion body (2) with the heating device (1) being interposed between the two cushion bodies, and to such laminated bodies, the covering member (4) is bonded, whereupon the assembling process is much simplified and the costs therefor are lowered. Thus, there is no need to sew the trim cover assembly to accommodate the heating device therein, and to stretch the trim cover assembly along the upper surface of the main cushion body, which is requied in the foregoing prior arts.

Further, the heating device (1), by the reason of its being accommodated in the recessed region (31) of the sub cushion body (3) (or the recessed one (21) of the main cushion body (2)), are positioned at a given point without dislocation. According to such structure, the heating device (1) is covered with the sub cushion body (3), thereby preventing its hard unpleasing touch from being felt by an occupant who sits thereon, so that the soft seating touch of the seat is maintained as it is.

The description above has just been given of preferred embodiments of the present invention, but it should be understood that the invention is not limited to the embodiments illustrated, but various other replacements, modifications and additions may structurally be possible without departing from the scope and spirit of the appended claims for the invention.

What is claimed is:

1. An automotive seat with a heating device, comprising:
    a foam main cushion body formed by foaming in a mold into a predetermined shape:
    a foam sub cushion body made of a slab material, said sub cushion body being mounted on said main cushion body;
    a covering member which covers and is bonded is said main and sub cushion bodies;
    a recessed portion formed in an inner surface of said sub cushion body facing an upper surface of said main cushion body; and
    a heating device accommodated within said recessed portion.

2. An automotive seat with a heating device, comprising:
    a foam main cushion body formed by foaming in a mold into a predetermined shape;
    a foam sub cushion body made of a slab material, said sub cushion body being mounted on said main cushion body;
    a covering and is bonded to member which covers said main and sub cushion bodies;
    a recessed portion formed in an upper surface of said main cushion body facing an inner surface of said sub cushion body; and
    a heating device accommodated within said recessed portion.

3. The automotive seat according to claim 1, wherein said covering member is bonded to a surface of said main cushion body as well as to that of said sub cushion body.

4. The automotive seat according to claim 2, wherein said covering member is bonded to a surface of said main cushion body as well as to that of said sub cushion body.

5. The automotive seat according to claim 1, wherein said sub cushion body is bonded to an surface of said main cushion body.

* * * * *